INVENTOR.
W. L. Hawk

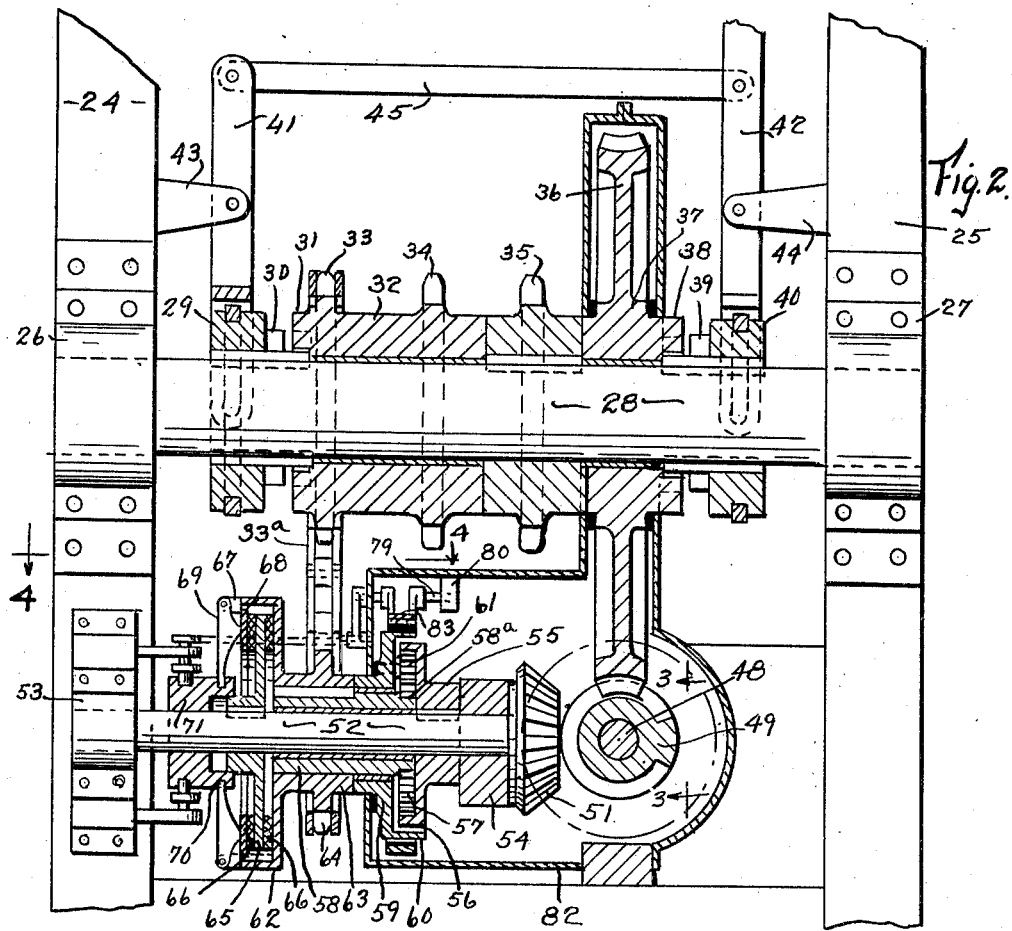

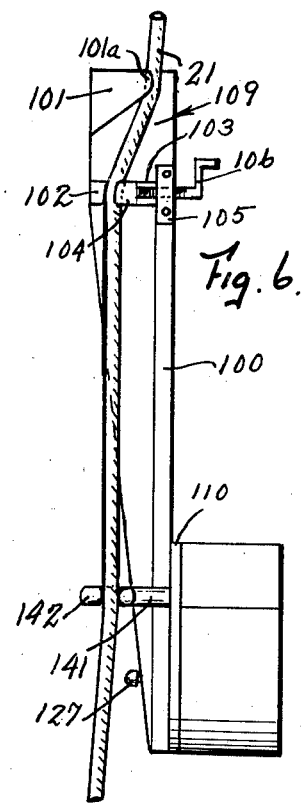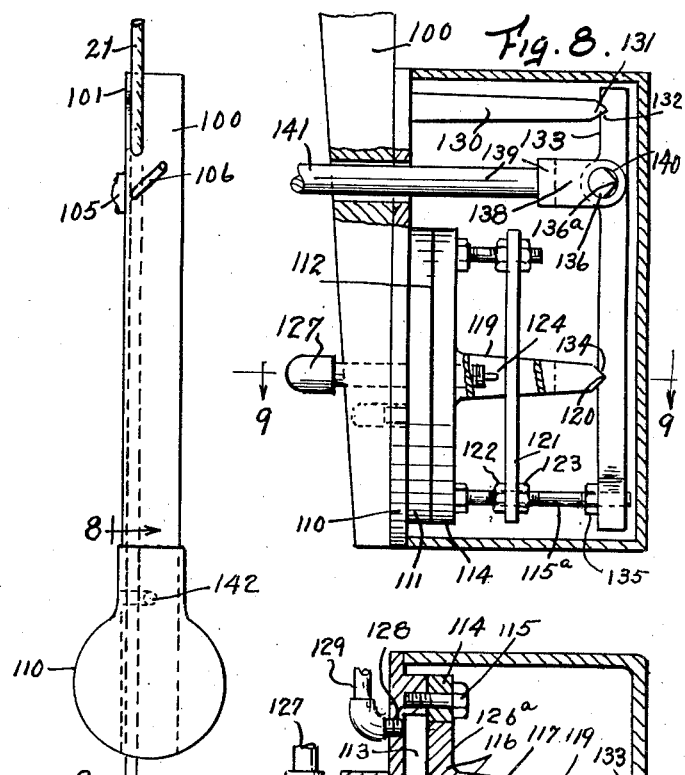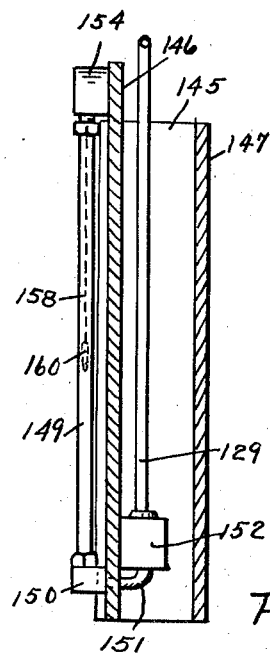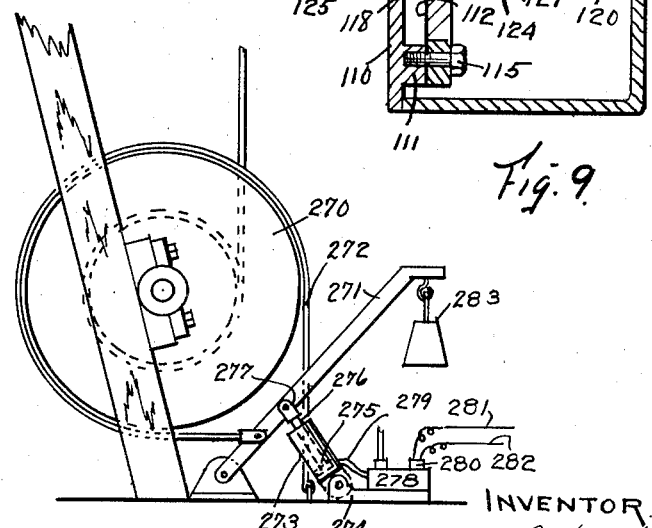

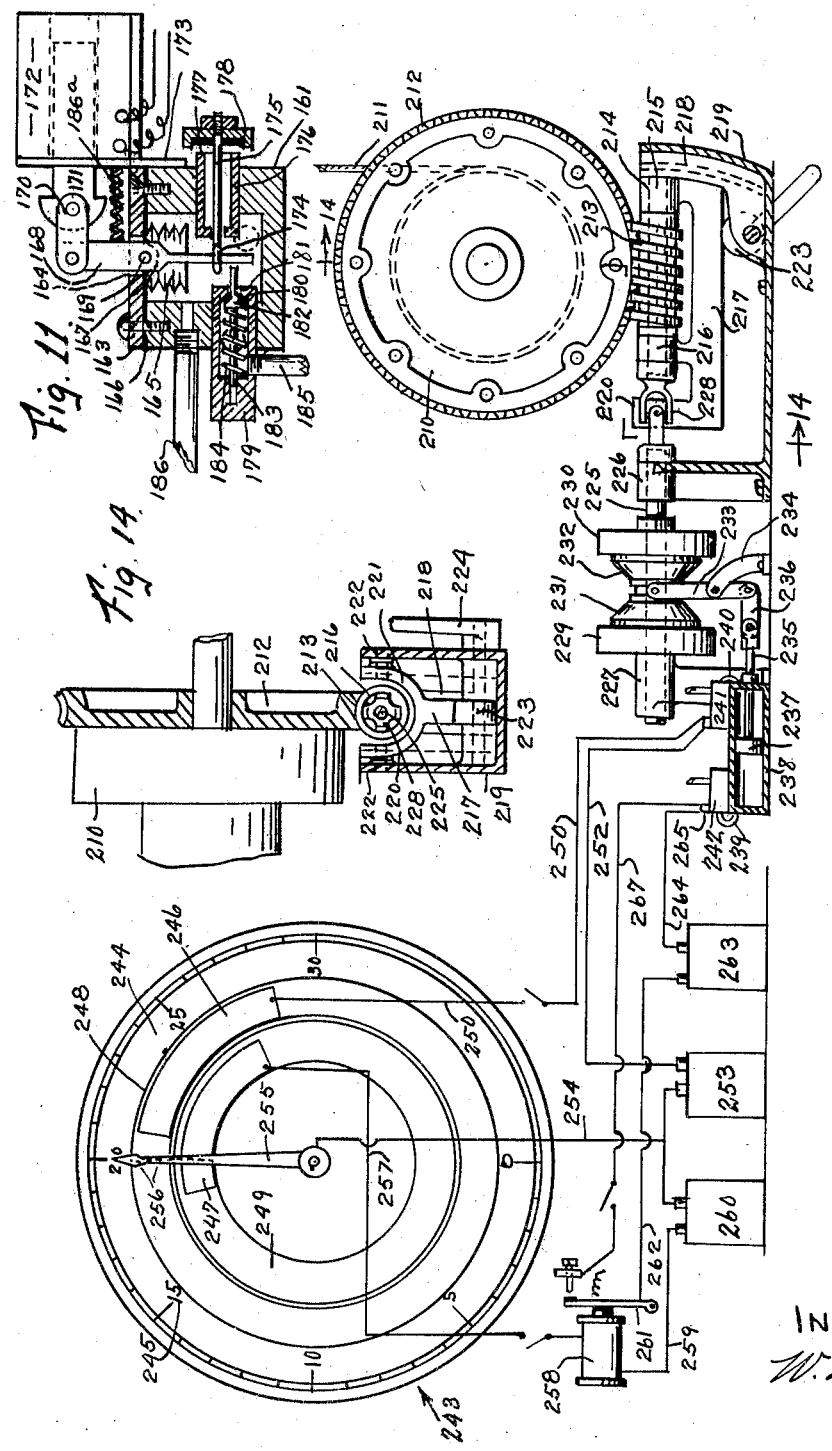

April 10, 1934.   W. L. HAWK   1,954,670
COMBINED WEIGHING DEVICE AND AUTOMATIC DRILL CONTROL
Filed Dec. 28, 1929   5 Sheets-Sheet 5
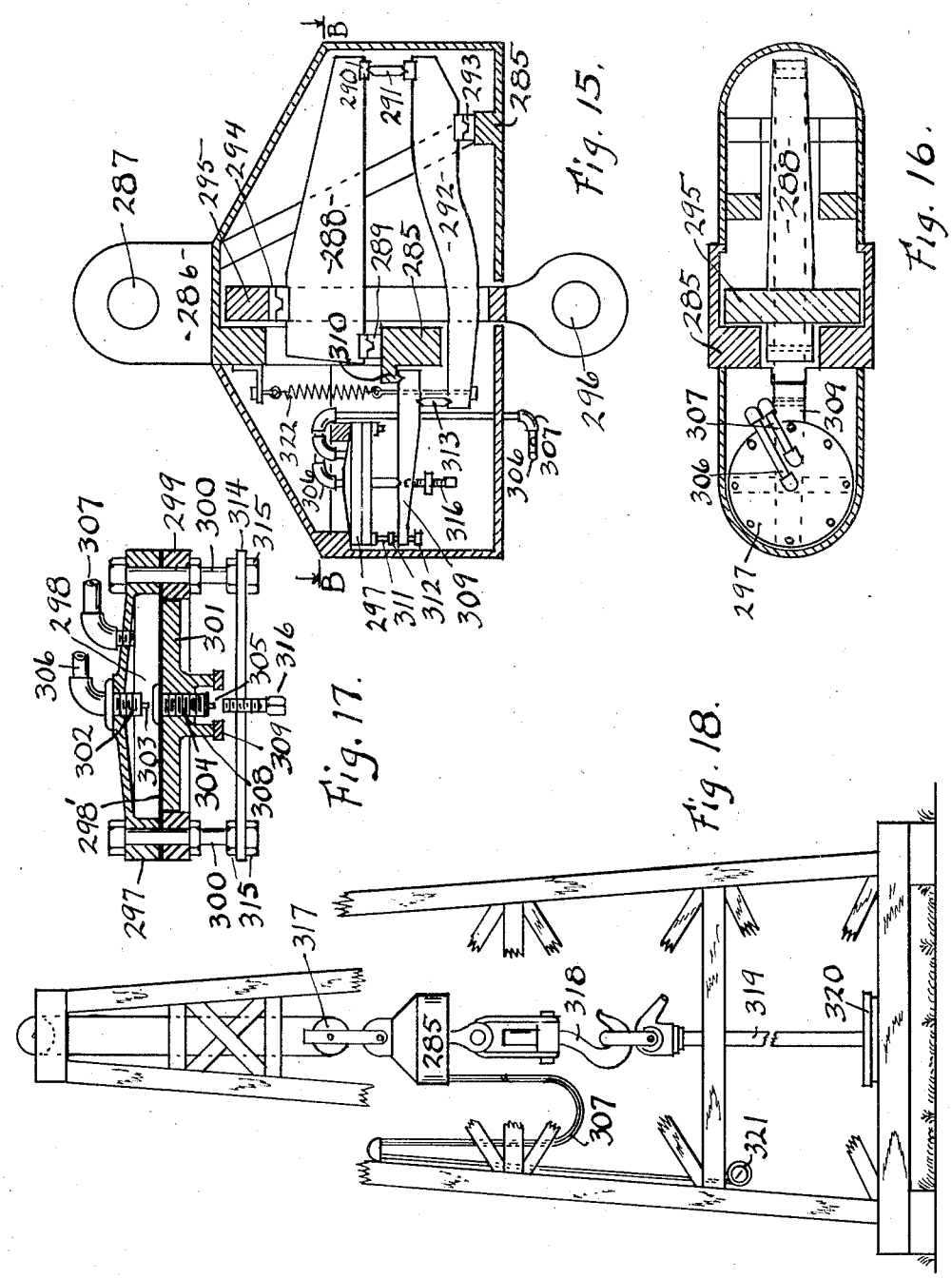
INVENTOR.
Watson L. Hawk Patented Apr. 10, 1934

1,954,670

UNITED STATES PATENT OFFICE 1,954,670

COMBINED WEIGHING DEVICE AND AUTOMATIC DRILL CONTROL

Watson L. Hawk, Long Beach, Calif.

Application December 28, 1929, Serial No. 417,108

10 Claims. (Cl. 255—19)

This present invention is an improvement upon that device shown and described in an application heretofore filed by me under date of August 19, 1929, Serial No. 387,061, for Weight indicating device for well drilling apparatus.

It is the object of this invention to provide mechanism which will not only indicate the weight of the drill string but will also automatically maintain a predetermined pressure upon the drill bit, raising the drill when the pressure exceeds said predetermined point and lowering or feeding the drill when said pressure falls below said predetermined point, this adjustment of the drill being controlled by the weight of the drill string and the weighing mechanism.

Another object is to provide mechanism of the above character which can be installed for use without materially altering the present drilling mechanism, and which will be simple in construction and operation, easily and quickly adjustable for any desired pressure and of a maximum efficiency in operation.

Other objects and advantages will appear hereinafter, and, while I have shown and will describe the preferred form of my device, it will be understood that I do not limit myself to such preferred form, but that various changes and adaptations may be made therein without departing from the spirit of my invention.

In the drawings accompanying and forming a part hereof;

Fig. 2 is an enlarged section, partly in elevation, taken on the line 2—2 of Fig. 1.

Fig. 3 is a fragmentary elevation on the line 3—3 of Fig. 2, looking in the direction of the arrow.

Fig. 4 is a section on the line 4—4 of Fig. 2.

Fig. 5 is a section on the line 5—5 of Fig. 4.

Fig. 6 is a side elevation of the weighing and actuating mechanism on an enlarged scale.

Fig. 7 is a right hand elevation of Fig. 6.

Fig. 8 is an enlarged section on the line 8—8 of Fig. 7, with parts in elevation.

Fig. 9 is a transverse section on the line 9—9 of Fig. 8.

Fig. 10 is a section on the line 10—10 of Fig. 1.

Fig. 11 is a longitudinal section through one of the solenoid valves used with my device.

Fig. 12 is another form of the drill control mechanism.

Fig. 13 is a side elevation of my invention as applied to the calf wheel of a draw works and is a modification of my preferred form.

Fig. 14 is a section on the line 14—14 of Fig. 13.

Figure 15 is a cross section showing parts in elevation, of an alternate form of my actuator.

Figure 16 is a plan section taken on line B—B of Figure 15. Figure 17 is an enlarged cross section through the diaphragm.

Figure 18 is an elevation with parts broken away, showing the alternate form of my actuator positioned for use in a derrick.

Figure 1:
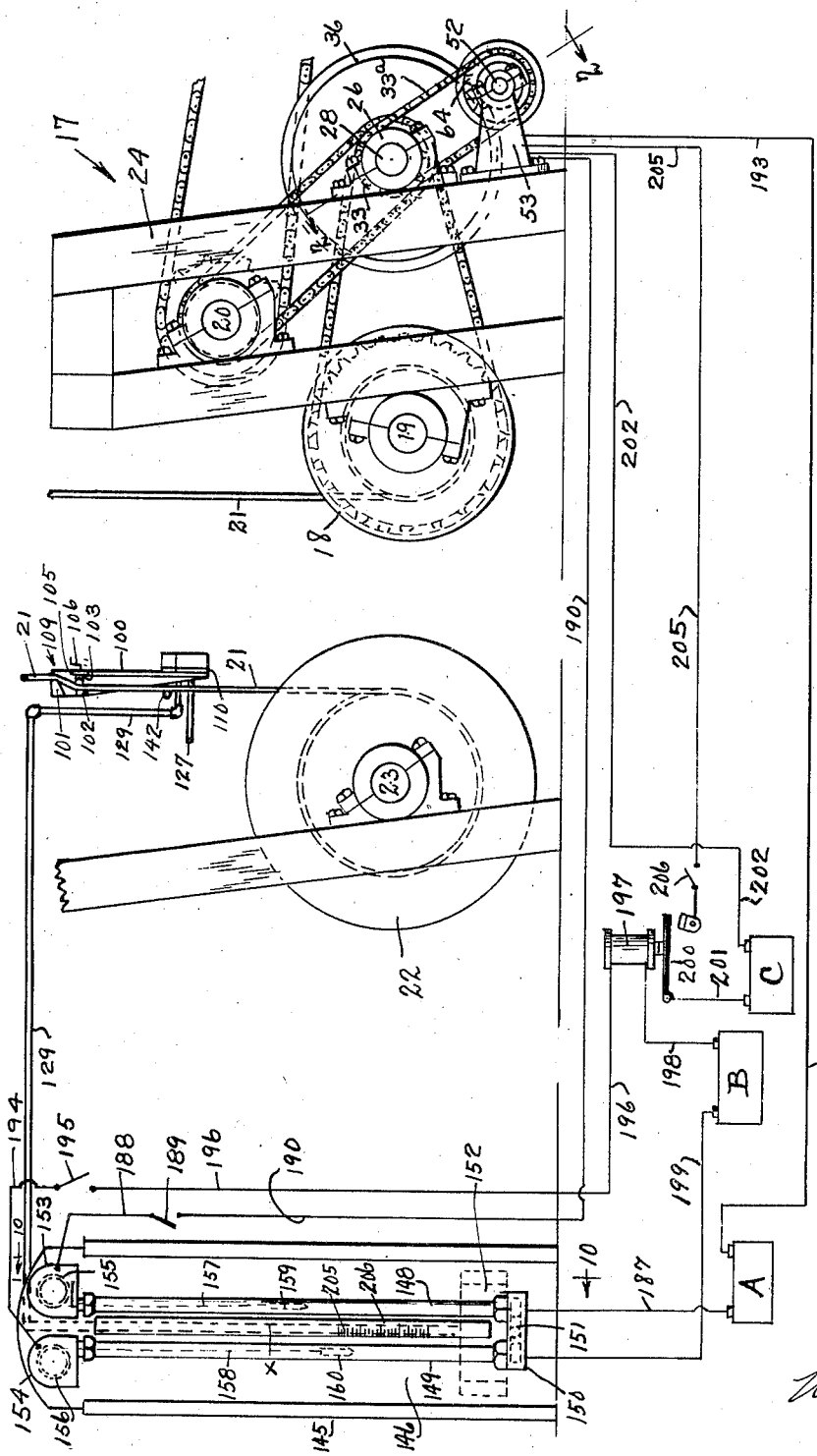
Fig. 1 is a side elevation of a draw works with my invention installed in position for use.

In referring to the drawings it will be understood that, while the present invention is complete in itself, with the weighing and actuating mechanism mounted upon and actuated by the dead line, the weighing mechanism is employing the same principles as the device shown and described in my prior application above mentioned and the present drill control mechanism is equally adaptable for use with the said prior device.

In the drawings 17 indicates the draw works of any of the well known types, 18 the cable drum, 19 the cable drum shaft and 20 the line shaft. 21 indicates the cable, 22 the calf wheel and 23 the calf wheel shaft, all of the above being standard equipment.

In installing my device I mount upon suitable uprights 24 and 25 of the draw works, bearings 26 and 27 and in these bearings I mount, rotatably, a shaft 28. Slidably but non-revolubly mounted upon shaft 28 near one end thereof, (see Fig. 2) is a clutch member 29 provided with outwardly projecting jaw teeth 30, which teeth are adapted for engagement with the teeth 31 in the end of a sleeve 32 loosely mounted upon shaft 28 whereby said shaft is caused to rotate with said sleeve. Sleeve 32 is provided with peripheral sprocket teeth 33 and 34 for a purpose to be hereafter explained. Rigidly mounted upon the shaft 28 at the side of the sleeve 32 is a sprocket wheel 35, and loosely mounted upon said shaft at the side of the said sprocket wheel 35 is a worm wheel 36 from the outer face of the hub 37 of which project clutch teeth 38, which teeth are adapted for engagement with the teeth 39 of the clutch member 40, slidably but non-revolubly mounted upon said shaft at the outer side of the said worm wheel 36. Clutch levers 41 and 42, pivoted to the uprights 24 and 25 by the brackets 43 and 44 control the position of the clutch members 29 and 40, said levers being connected by a link 45 so that said clutches are operated in unison as hereafter explained.

Rotatably mounted at its ends in bearings 46 and 47, secured to the uprights 24 and 25 is a shaft 48 and on this shaft is rigidly mounted a worm 49 adapted for engagement with the worm wheel 36, and rigidly mounted upon said shaft, at one end of said worm 49 is a bevel gear 50, the teeth of which mesh with the teeth of a similar bevel gear 51 rigidly mounted upon shaft 52. Shaft 52 is rotatably mounted in bearings 53 and 54 supported by the uprights 24 and 25. Rigidly secured upon the shaft 52 at the inner side of the bearing 54 is an internal gear member 55 provided with a peripheral annulus 56 in which are provided internal gear teeth 57. Loosely mounted upon the shaft 52 at the side of the member 55 is a sleeve 58 in the adjacent end of which are provided gear teeth 58a, and rotatably mounted upon this sleeve, at one end thereof is a clutch member 59 provided with a peripheral annulus 60 which surrounds the annulus 56. Rotatably mounted upon the inner face of the clutch member 59 is a spur gear 61 in operative engagement with the teeth 57 of the gear member 55 and the teeth 58a of the sleeve 58. Rigidly secured upon the other end of the sleeve 58 is a clutch drum 62 provided with an elongated hub 63, around the periphery of which radiate the sprocket teeth 64. Rigidly mounted upon the shaft 52 and within the clutch drum 62 is a disc 65 provided on each side, at the edges, with friction members 66 of fabric or other suitable material. Projecting from the open side of the clutch drum 62 are arms 67 and supported by the inner edges of these arms, and held from relative rotation thereby, is a ring 68. Pivotally mounted at their outer ends in the arms 67 are the clutch fingers 69, of which I have shown four, but more or less may be used if found necessary or desirable, and these fingers extend inwardly and have their free ends loosely mounted within a groove 70 provided in the clutch collar 71. Collar 71 is loosely mounted upon the shaft 52 and its movement longitudinally of said shaft is controlled by a lever 72, pivotally mounted intermediate its ends, in the ends of brackets 73 projecting from the bearing 53. The pivot 74 upon which lever 72 is mounted projects beyond one of the bearings 73 and, rigidly secured upon this projecting end is one end of an arm 75, the other end of which is connected by a universal or knuckle joint 76 to one end of a downwardly depending link 77. The upper end of the link 77 is pivotally connected to one end of the lever 78. The other end of the lever 78 is rigidly connected to the end of the pintle 79.

Pintle 79 is rockably mounted in bearings 80 and 81, provided in the housing 82. A band 83 surrounds the annulus 60 of the clutch member 59 and is provided with a friction lining 83a preferably of the usual type such as is used as brake lining or the like. One end of this band is pivotally connected to one end of the links 84 and 85, which links are rigidly mounted, intermediate their ends, upon pintle 79. The other end of the band 83 is pivotally, and adjustably, connected, by means of the turnbuckle 86, to the other ends of the links 84 and 85.

The lower end of the clutch operating lever 72 is pivotally connected to the yoke 87, provided upon the end of the piston rod 88. The other end of the rod 88 is connected to a piston 89 slidably mounted within the cylinder 90. Coil springs 91 and 92, mounted within the cylinder 90 at opposite sides of the piston 89, serve to hold said piston normally centered lengthwise of the cylinder 90.

As best shown in Figures 6, 7, 8 and 9, my weighing and actuating mechanism comprises an elongated, vertically extending arm 100 on one side of the upper end of which is provided an abutment 101 the edge of which is slightly recessed for the reception of the cable 21. Formed upon the outer edge of the arm 100 at a suitable distance below the abutment 101 is an anvil or abutment 102. Provided in the side of the arm 100, in transverse alinement with the anvil 102 is a guideway 103 and in this guideway is slidably mounted a clamping block or line deflector 104. Projecting outwardly from the side of the arm 100 in transverse alinement with the anvil 102 is a standard 105, and projecting through this standard, in screw threaded engagement therewith and in transverse alinement with the guideway 103 is an adjusting screw 106 by means of which the position of the block 104 is adjusted, the object of this construction being to permit the cable 21 to be deflected or bent as best shown at 109. Provided upon the opposite or lower end of the body 100 is a platform 110 in which is formed a ring or annulus 111, and extending across the outer face of this annulus is a diaphragm 112, forming an airtight chamber 113 within annulus 111. Diaphragm 112 is preferably formed of rubber, although any other suitable material may be used, and is held positioned by a ring 114, between which and the outer face of the annulus 111 its edges are clamped by means of the bolts 115. Mounted within the ring 114 at the outer side of the diaphragm 112, is a piston 116, through which projects the air valve 117, preferably of the Schrader type, the head 118 of said valve serving to securely fasten said diaphragm to said piston. Projecting from the outer face of the piston 116 is a standard 119 the outer end of which terminates in a knife edge 120. Two of the opposed bolts 115 project outwardly from the ring 114 for a suitable distance and are screw-threaded, and mounted at its ends upon these bolts is a bar 121, held adjustably positioned by the nuts 122 and 123. The projecting end 124 of the Schrader valve 117 is adapted to contact with bar 121 as hereafter explained. Projecting through the platform 110 is a screwthreaded aperture 125 in which is screwthreadedly mounted an air valve 126, similar to valve 117, the projecting end 126a of which is adapted to be engaged by the head 118 of valve 117 when the piston 116 moves inwardly.

The other end of the valve 126 is connected by a pipe 127 to a suitable source of fluid pressure, not shown. Extending through the platform 110 in any suitable location, is an aperture 128 in which is screwthreadedly mounted one end of the outlet pipe 129, the other end of which is connected to the indicator mechanism.

Projecting from the platform 110 at the upper end thereof is a standard 130, the free end of which terminates in a knife edge 131, which normally rests within a recess 132 in the end of the lever 133. Lever 133 is provided, intermediate its ends with a recess 134 in which the knife edge 120 of the standard 119 rests. The other end of the lever 133 is bifurcated and straddles one of the bolts 115a, projecting from the ring 114, a nut 135 serving to adjustably limit the movement of the said lever at that end. Rigidly mounted in the other end of said lever 133 to project from opposite sides thereof is a pintle 136, the outer ends of which are formed into knife edges 136a, and mounted upon these projecting ends are the legs 138 of a yoke 139, apertures 140 being provided therein for the reception of said projecting ends. The other end of the member 139 is connected to one end of a rod 141, the other end of which terminates in a hook 142 adapted to straddle the cable 21.

*Indicator and control mechanism*

As best shown in Figs. 1 and 10, this mechanism comprises a substantially rectangular housing 145, the front wall of which is closed by a panel 146, and the rear of which is normally closed by a removable panel 147. Mounted upon the front face of the panel 146, to extend vertically, are spaced tubes 148 and 149, preferably of glass, the lower ends of which are connected to the top wall of the manifold 150. Manifold 150 is rigidly mounted upon the front face of panel 146, and a tube 151 extends from the bottom wall thereof, through panel 146, and is connected to the bottom wall of the reservoir 152 mounted upon the rear face of said panel 146, to the top wall of which is connected the other end of the air pipe 129. The upper ends of the tubes 148 and 149 are connected to the bottom walls of the housings 153 and 154, respectively, which housings are secured upon the front face of panel 146 at the top. Rotatably mounted within the housings 153 and 154 are reels 155 and 156 and upon these reels are wound the conductor wires 157 and 158, the inner end of each wire being secured to its respective reel. Housings 153 and 154 are insulated from each other and from the manifold 150. The free ends of the wires 157 and 158 depend downwardly into the respective tubes 148 and 149 and support upon their lower ends the electrodes 159 and 160. As best shown in Fig. 11, the solenoid valves used with my device comprise a substantially rectangular housing 161, provided with a detachable cover 163, and provided in this cover is a central aperture 164. An air tight bellows 165 surrounds the aperture 164 and is provided around its upper end with a flange 166 which flange is clamped between the upper edge of the housing 161 and the cover 163. Depending downwardly from the cover 163 within the bellows 165 are brackets 167, and in these brackets is pivotally mounted, intermediate its ends a rocking arm 168, by means of the pivot 169. The upper end of the arm 168 is pivotally connected to one end of a link 170, the other end of which is pivotally connected to the projecting end of the core 171 of the magnet 172. Magnet 172 is rigidly mounted upon a bracket 173 mounted upon one end of the housing 161. The other end of the arm 168 depends downwardly, is reduced in size, passing through the bottom wall of the bellows 165, and its lower end passes through an eye 174 formed in the inner end of the stem 175 of the exhaust valve 176. The lower wall of the bellows 165 and the reduced end of the arm 168 are soldered or otherwise secured together in air tight connection. The exhaust valve comprises the housing 176, screw threadedly mounted in the end wall of the housing 161 and connecting the interior of said housing to atmosphere, with its outer end terminating in a valve seat 177 which seat is adapted to be closed by the valve 178 mounted upon the outer end of the stem 175. Mounted in the opposite wall of the housing 161 is the inlet valve comprising the housing 179, closed at its outer end and being provided near its inner end with a tapered valve seat 180 through which the inlet opening 181 extends. A tapered valve 182 mounted within the housing 179, is adapted to control the passage of fluid through the aperture 181, and is provided with a stem 183 one end of which projects through the said aperture 181 and terminates in front of the arm 168. A spring 184 coiled around the stem 183, within the housing 179, normally acts to hold the valve 182 upon its seat and prevents the passage of fluid through the inlet opening.

A pipe 185 connects the interior of the housing 179 to a suitable source of fluid pressure supply (not shown), and a pipe 186 connects the interior of the housing 161 to the clutch operating cylinder 90. In operation the parts will normally be in the positions shown. Energizing the magnet 172 will cause the same to retract the core 171 thereby rocking the upper end of the arm 168 to the right and the lower end thereof to the left. The movement of the said lower end to the left will, by means of the eye 174, move the stem 175 to the left causing the valve 178 to seat and close the opening therethrough. At the same time the said lower end of the arm 168 will engage the projecting end of the inlet valve stem 183 and move valve 182 to the left off its seat and permit fluid to enter through the inlet opening 181. When the magnet is deenergized the spring 186ª will return the parts to their normal positions.

In order to more clearly illustrate the operation of my device I have shown it as being equipped with three separate sources of electrical energy but it will be obvious that any common source of energy will be equally efficient. The tube 148 is designated as the feeding tube and the tube 149 as the lifting tube, it being understood that the height of the mercury will be equal in both tubes and that the rise and fall thereof will be in unison, in fact both electrodes could be positioned within a single tube if it were not for the difficulty of insulating them from each other. Manifold 150 is connected by wire 187 to one side of the battery A. Housing 153 is connected by wire 188 to one side of the cut out switch 189, the other side of which is connected by wire 190 to one side of the magnet of the solenoid valve 192. The other side of magnet is connected by wire 193 to the other side of the battery A. Housing 154 is connected by wire 194 to one side of the cut out switch 195, the other side of which is connected by wire 196 to one side of the relay magnet 197. The other side of magnet 197 is connected by wire 198 to one side of battery B. The other side of battery B is connected by wire 199 to the manifold 150. One side of the relay switch 200 is connected by wire 201 to one side of battery C, the other pole of which is connected by wire 202 to one side of the magnet of solenoid valve 204, the other side of which magnet is connected by wire 205 to the other side of the relay switch 200, through the cut out switch 206.

In the operation of this form of my device, after the total weight of the tool string has been determined, the electrodes will be positioned within the tubes at the necessary height to maintain the desired pressure upon the drill. The arm 100 will first be mounted upon the dead end of the line or cable 21 near the calf wheel 22, with the cable passing between the anvil 102 and the block 104 and in front of the abutment 101, it being understood that the block 104 is first retracted to facilitate positioning the arm upon the cable. The screw 106 will then be rotated to bring the clamping block 104 to bear upon the cable and securely clamp the same between said block and anvil, and at the same time deflect or bend the cable 21. The weight suspended upon the cable tends to straighten this deflected portion and in doing so the cable tends to rotate the arm around the point 101a, that is, the lower end of the arm tries to move outwardly away from the cable, and this movement is transferred by means of the hook 142 to the lever 133. The upper end of the lever 133, being supported upon the end of the fixed standard 130, maintains its position while the other end, being free to move, moves inwardly forcing the piston inwardly. As the travel of the piston is limited and as the distance the mercury travels upwards in the tubes is in direct proportion to the air pressure within chamber 113, the pressure within the air chamber may not be in equilibrium with the pressure exerted upon the piston by lever 133 in which case the piston will be forced inwardly until the head 118 of valve 117 depresses the projecting end of the stem of valve 126 admitting a supply of fluid under pressure into chamber 113 from whence it flows through the outlet pipe 129 into the reservoir 150. It will be understood that a suitable supply of mercury or other suitable fluid has been previously placed within reservoir 152 and the fluid entering the reservoir at the top will force the mercury out through pipe 151 into the manifold 150 and into the tubes 148 and 149 until a height is reached which balances the pressure of the fluid from chamber 113. When the pressures are equalized the piston will retract and permit the valve 126 to close.

The balancing of the pressure within the chamber 113 with the height of the mercury column in the tubes will indicate, by means of the indicia 205 upon the scale 206, from the said height of the mercury column, the weight of the suspended load. When the weight of the suspended load is decreased the air in the chamber 113 expands, causing the piston to move outwardly and bringing the end 124 of the valve 117 into contact with the bar 121, opening said valve and permitting air to escape from said chamber 113 to atmosphere until equilibrium is reestablished between the pressure in the chamber and that of lever 133. During this time the column of mercury in the tubes falls until the weight thereof equals the pressure of air within chamber 113 and the scale 106 will then indicate the weight of the suspended load.

As an example we will assume that the height of the mercury column is at the point X on the scale 206. The lower end of the electrode 159 will be positioned by rotating the reel 155 to a point below X which corresponds to the maximum weight it is desired to impose upon the drill bit. The lower end of the electrode 160 will be positioned at a point below X which corresponds to the maximum weight it is thought safe to impose upon the drill bit, it being understood that the electrode 160 should always be positioned lower than the electrode 159. When the tool string is hanging free the mercury column will have risen to the point X. The cut-out switches are then closed. Current will then flow through wire 187, manifold 150, the mercury column in tube 148, electrode 159, wire 157, housing 153, wire 188, switch 189 and wire 190 to the magnet of the solenoid valve 192, through wire 193 to the other pole of the battery A, energizing the magnet and opening the valve 192 to admit fluid under pressure to cylinder 90 at the right of the piston 89 and forcing said piston 89 to the left and through the medium of the lever 72 and arm 75 tightening the band 83 into engagement with the annulus 60 of the clutch member 59.

The sprocket teeth 34 will be connected by a suitable sprocket chain, not shown, to a source of power, not shown whereby the sleeve 32 is rotated constantly. Sprocket teeth 33 are connected by chain 33a to the sprocket teeth 64 of the clutch drum sleeve 63 whereby constant rotation is imparted from sleeve 32 to the clutch drum 62. The free end of the lever 42 will be moved to the right thereby bringing the clutch teeth 38 and 39 into operative engagement and locking the worm wheel 36 to the shaft 28.

As the clutch drum 62 rotates sleeve 58 will also rotate and, through the medium of the teeth 58a on the inner end of said sleeve, rotate the spur gears 61 which will in turn rotate the internal gear member 55 and member 55, being keyed to the shaft 52 will rotate said shaft. The rotation of the shaft 52 will through the medium of the bevel gears 51 and 50 rotate the shaft 48 and worm 49. The rotation of the worm 49 will rotate the worm wheel 36 and this will, through the medium of the clutch member 40, rotate the shaft 28. Sprocket 35 is connected by a chain 35a to the sprocket 18a of the cable drum 18, and the rotation of said shaft 28 will rotate the sprocket 35 and through the chain 35a will impart rotation to the said cable drum in a direction to unwind the said cable from the drum and lower the tool string. As soon as the drill bit touches the bottom part of the weight thereof is supported thereby and the strain upon the weighing mechanism is eased up. This causes the mercury column to fall in the tubes until the upper end thereof is below the lower end of electrode 159 which breaks the circuit and deenergizes the magnet permitting the valve 192 to close its supply port and open its exhaust port and permit the air to escape from the cylinder 90 when the spring 91 will return the piston to its normal position centrally of the cylinder and release the clutch band 83 when the rotation of the cable drum will cease. As the weight of the tool string in excess of the amount being exerted upon the drill bit is depending upon the cable, it is evident that the cutting away of the material by said drill bit will cause additional weight to be exerted thereupon and this will cause the mercury columns to rise until contact is again made with the electrode 159 and the feeding mechanism will be again set into action. It is, of course, obvious that the adjustment of the position of the electrode will be such that the feeding mechanism will operate practically continually.

The circuit which controls the relay magnet will be termed the primary circuit and the circuit through the relay switch will be termed the secondary circuit. As will be seen the primary circuit is a normally closed circuit acting to hold the relay switch open, thereby holding open the secondary circuit. In its normal or operating position the location of the electrode 160 is such that it is immersed in the mercury for a distance so that the circuit from the battery B to the relay magnet is closed and the arm 200 is attracted forming a gap in the secondary circuit. If the feeding of the drill bit is too fast, or if, for any other reason, the pressure upon the drill bit increases beyond the predetermined amount, the strain upon the mercury column is eased and the mercury columns fall until contact between the mercury column in tube 149 and electrode 160 is broken. This deenergizes the relay magnet 197 and permits the relay arm or switch 200 to fall away from the magnet and bridge the gap in the secondary circuit. Current will then flow through wire 201, relay arm 200, wire 205, to one side of the magnet of the solenoid valve 204 and through wire 202 to the other pole of the battery C, energizing said magnet and opening valve 204 which permits air or fluid under pressure to enter the cylinder 90 at the left of piston 89 forcing said piston to the right and through the medium of the lever 72 closing the clutch members 62 and 65 causing the same to be locked to shaft 52 and the same will thereupon rotate with said clutch drum. The rotation of shaft 52 will again rotate the cable drum as before described but in a reverse direction and to raise the tool string by winding the cable upon the drum. As the tool string is raised the weight thereof will be transferred to the weighing mechanism which causes the mercury column to raise until contact is again made between the same and the electrodes it being understood that contact will be made with the electrode 160 and its mercury column and the raising mechanism rendered inoperative before contact is made between the mercury column in tube 148 and electrode 159, due to the lower position of the electrode 160.

In Figures 13 and 14 I have shown my device as adapted for operation upon the calf wheel instead of the cable drum. In this form 210 indicates the calf wheel of a draw works and 211 the dead end of the cable. Rigidly secured to the outer side of the calf wheel, concentric therewith, is a worm gear 212 adapted for operative engagement with the worm 213. Worm 213 is rigidly mounted upon a shaft 214, which shaft is rotatably mounted, near its ends, in bearings 215 and 216 forming part of the adjustable carriage 217. The rear end of carriage 217 is mounted to slide vertically in guideways 218 formed in the inner face of the rear wall of the housing 219 and the other end of said carriage is pivotally connected to the side walls of said housing by means of the upstanding arms 220 and 221 and the pintles 222. An eccentric 223 is rotatably mounted within housing 219, immediately below the rear end of carriage 217 whereby rotation of said cam will elevate or lower the rear end of said carriage and move worm 213 into or out of engagement with worm wheel 212. A handle 224 at the outer side of the housing 219 provides means for rotating said eccentric. A drive shaft 225 is mounted to rotate in bearings 226 and 227, suitably positioned in alinement with the bearings 215 and 216 and shaft 214, and a universal joint or coupling 228, of any suitable or desired type connects the adjacent ends of said shafts. It will be noted that the pintles 222 are so positioned in the housing 219 as to be in alinement with the pivotal connection of the said universal joint, the object of which will be obvious. Loosely mounted upon the shaft 225 between the bearings 226 and 227 are spaced opposed drive clutches 229 and 230, which are rotated in reverse directions by means of belts or otherwise. Cones 231 and 232, integrally secured together, are slidably mounted upon shaft 225 between the clutch members 229 and 230 and are adapted to lock one or the other of said clutch members to shaft 225. A clutch lever 233, pivotally mounted between its ends in the upper end of the bracket 234, has its upper end operatively connected to the cones 231 and 232, and has its lower end connected to the projecting end of the piston rod 235 by a link 236. The other end of the rod 235 is connected to the piston 237, slidably mounted within the cylinder 238. The said piston is normally positioned centrally of the cylinder 238 and is adapted to travel in either direction, depending upon which clutch it is desired to control. The opposite ends of the cylinder are connected by the pipes 239 and 240 to the solenoid valves 241 and 242. 243 indicates a pressure gage of any of the usual hand indicator types provided with a dial 244 in lieu of the usual dial. Dial 244 is preferably formed from insulating material such as fiber, bakelite or the like and has provided around its outer edge the index figures or numerals 245. Formed in the face of the dial 244 are concentric recesses and in these recesses I mount the adjustable contact members or segments 246 and 247. These contact members are preferably formed of metal such as brass and are held adjustably positioned within the grooves or recesses 248 and 249 in any suitable or desired manner. Contact member 246 is the feeding contact and contact member 247 is the lifting contact. Contact 246 is connected by wire 250 to one side of the magnet of the solenoid valve 241. The other side of said magnet is connected by wire 252 to one pole of the battery 253. The other side of the battery 253 is connected by a wire 254 to the indicator hand 255 of the gage 243. On the underside of the hand 255 is provided a brush contact member 256 adapted to contact with the contacts 246 and 247. The contact member 247 is connected by a wire 257 to one side of the relay magnet 258, the other side of which is connected by wire 259 to one side of a battery 260. The other side of battery 260 is connected to the indicator hand 255.

One side of the relay switch 261 is connected by wire 262 to one side of the battery 263, the other side of which battery is connected by wire 264 to one side of the magnet 265 of the solenoid valve 242. The other side of magnet 265 is connected by wire 267 to the other side of the relay switch 261. The operation of this form will be clearly understood from the prior description of the operation of the preferred form.

In the form shown in Figure 12,—270 indicated the usual brake drum of the cable drum, 271 the operating lever therefor, and 272 the usual brake band. In this form I provide a cylinder 273 pivotally secured to the floor of the derrick by means of the bracket 274 or otherwise. Provided in the cylinder 273 is a piston 275 provided with the piston rod 276, the projecting end of which rod is connected, by means of the yoke 277, to the operating lever 271. A solenoid valve 278 has its outlet pipe 279 connected to the inlet opening of the cylinder 273. Valve 278 is provided with an operating magnet 280 which is connected by the wires 281 and 282 to the control mechanism heretofore described. If desired or found necessary the position of the cylinder 273 may be reversed, that is, it may be mounted above the operating handle by suitable supports and be operated to pull said handle upwardly instead of pushing it up as shown.

In the operation of this form, as the weight upon the cable is increased the solenoid valve is set into action by the actuating mechanism to admit fluid under pressure into cylinder 273 forcing the piston upwardly and with it the operating lever 271 thus releasing the brake and permitting the drum to rotate to unwind the cable and lower the tool string, and as the strain is eased off, the magnet of the solenoid valve is deënergized and the valve rendered inoperative exhausting the air from the cylinder 273 and permitting the weight 283 to return the lever to normal applying the brake and preventing further rotation of the cable drum.

Referring again to Fig. 2, it will be obvious that, with certain modifications, the jack shaft may be dispensed with and the mechanisms carried thereby mounted upon the line shaft without in any way altering the operation or effectiveness of my device.

In the form of actuator shown in Figure 15,—285 is a housing or frame work with a pair of spaced ears 286 projected upward and having an eye 287 to engage a pin which fastens said housing to the traveling block. The said frame work supports one end of a beam 288 by means of the bearing blocks 289. The other end of beam 288 is carried by bearing blocks 290 and 291 which in turn rest on one end of the lever 292 placed under and in alignment with beam 288. Lever 292 is supported, intermediate its ends, by bearing blocks 293 resting on frame work 285. Hanging astride beam 288 on bearing blocks 294 is the bifurcated yoke 295 whose legs extend downward and terminate in eyes 296 which engage a pin to carry the bail of the usual hook from which hangs the tool string.

Secured to the frame work 285 is a flat capsule 297 which has a depression in one side forming an air-tight chamber 298 by means of a flexible diaphragm 298', said diaphragm being held in place by an annular member 299 fastened to the body of 297 by bolts 300. Mounted in said annular chamber 299 and provided for vertical movement to bend said diaphragm is a piston 301. Near the center of said piston is a check valve 304 of the Schrader type. A passage way through said valve, when open, permits fluid in chamber 298 to escape to atmosphere. A projection 305 of the valve core, when pushed, opens said valve. In the upper side of the body 297 is another check valve 302 of the Schrader type and having a projection 303 of the valve core which when pushed opens said valve. A passage way through valve 302, when open, permits fluid under pressure from a suitable source of supply to enter chamber 298 through the conduit 306. The valves 302 and 304 are held seated by springs and their normal position is closed. Valve 302 is positioned so that a limited movement upward of piston 301 brings the head of valve 304 in contact with projection 303 which opens said valve 302. A passage way from chamber 298 through conduit 307 leads to the indicating gauge. A pair of legs 308 projected downwardly from piston 301 terminate in knife edges and rest in a groove on lever 309, one end of which is hinged to the frame work 285 at 310. The other end of lever 309 is bifurcated and straddles around a bolt 311 having nuts 312 to limit the upward and downward movement of lever 309. The object of said nuts being to protect the ends of valves 302 and 304 from damage due to sudden and violent changes of the load. Lever 309 is connected to one end of the lever 292 by a spacing member 313 having beveled ends and it is provided so that a proportionate part of the load suspended from yoke 295 is communicated through beam 288, lever 292, lever 309 to piston 301. The spring 322 is provided to counterbalance the weight of the lever train.

Two of the bolts 300 are projected to hold the bar 314 by nuts 315 and positioned so that an adjustable set screw 316 in threaded relation to bar 314 is extended upward to come into contact with projection 305 of valve 304 to open same when piston 301 has traveled a suitable distance downwardly.

Figure 18 shows the actuator 285 suspended from the cable and blocks 317 and from said actuator is suspended the hook 318 and the tool string 319 extending downwardly through the rotary table 320. The conduit 307 leads down to a pressure gauge 321 which may be similar to one shown in Figure 13.

The operation is as heretofore described. A proportion of the weight of the tool string is communicated to piston 301 which moves upward against the valve 302 admitting fluid under pressure to chamber 298. As soon as equilibrium is established between the pressure in chamber 298 and the pressure coming onto the piston 301 from the load, said piston moves away from valve 302 allowing it to close. Gauge 321 now indicates the pressure in chamber 298. If more weight is added, the piston again moves upwardly admitting more fluid. It is understood that the pressure of the fluid supply is always greater than any pressure needed for chamber 298. If the weight is decreased, then the fluid in chamber 298 expands, forcing the piston 301 downward until the valve 304 comes against screw 316 which opens same and allows fluid in chamber 298 to escape until equilibrium is again established when valve 304 again closes.

I claim:

1. In an organization suitable for drilling a well; a cable; a tool string suspended from said cable; means to rotate said tool string; a draw-works including gearing and a drum on which to wind or unwind said cable thereby raising or lowering said tool string; a prime mover to rotate said tool string rotating means and said draw-works; a weight indicator comprising an actuator carried by said cable and being adapted to be actuated by a percentage of the weight of said tool string; a pressure gauge connected to said actuator by a suitable conduit; an elastic fluid under pressure in said actuator, conduit and pressure gauge; exhaust and supply means for said fluid pressure for causing said pressure gauge to indicate the pressure in said actuator; a pair of electric circuits; independent means operated by said pressure gauge for opening and closing said circuits; a pair of independent clutches interposed between the prime mover and cable drum adapted to control the transmission of power therebetween, one of said clutches being so arranged that when in its operative position, said drum will be rotated to wind said cable thereon and the other of said clutches being so arranged that when in its operative position, said drum will be rotated to unwind said cable therefrom; means adapted upon the closing of one of said electric circuits to move said winding clutch into operative engagement, and means adapted upon the closing of the other electric circuit to move said unwinding clutch into operative engagement.

2. In an organization suitable for drilling a well; a cable; a tool string suspended from said cable; means to rotate said tool string; a draw-works including gearing and a drum on which to wind or unwind said cable, thereby raising or lowering said tool string; a prime mover for rotating said tool string rotating means and draw-works; a weight indicator comprising, an actuator carried by said cable and being adapted to be actuated by a portion of the weight of said tool string; a pressure gauge; a connection from said pressure gauge to said actuator; an elastic fluid under pressure in said actuator and pressure gauge, exhaust and supply means for said fluid pressure adapted to cause the pressure gauge to indicate the pressure in said actuator; a clutch interposed between the prime mover and the cable drum, adapted when in its operative position to cause said drum to rotate in one direction, a clutch interposed between said prime mover and cable drum adapted when in its operative position to cause said drum to rotate in a reverse direction; an electrically operated means for controlling the movement of said clutches, means operated by said pressure gauge for controlling said electrically operated means.

3. In a well drilling apparatus the combination of draw-works; a cable and a tool string suspended from said cable with a load responsive actuator carried by said cable and operated by a deflection therein, and means adapted to be set into action by said actuator to cause the operation of said draw-works to raise or lower said tool string to maintain a predetermined portion of the weight of said tool string upon the cable and a predetermined portion of said weight upon the drill, said means comprising a pressure gauge, a connection between said pressure gauge and said actuator, an elastic fluid in said gauge and actuator; a pair of clutches interposed between said draw-works and a prime mover, for controlling the rotation of the cable drum, one of said clutches being adapted to cause said drum to rotate in one direction and the other of said clutches being adapted to cause said drum to rotate in a reverse direction; means for moving said clutches into and out of their operative positions, said means comprising a pair of electric switches, one for each clutch, operated by said pressure gauge; an electric circuit for each of said switches, fluid operated mechanism for moving said clutches, and means operated by the closing of said electric switches for setting said fluid operated means into action.

4. In a well drilling organization having a tool string, a cable to support said tool string, a draw-works including a cable drum to wind or unwind said cable thereby raising or lowering said tool string, and a prime mover to rotate said tool string and said cable drum; apparatus to maintain automatically a predetermined pressure of the drilling tool on the earth formation within set limits, said apparatus comprising, a weight indicator consisting of an actuator interposed between the traveling block and said tool string, said actuator having a housing with a capsule mounted therein, said capsule having an air-tight inner chamber, one wall of which is closed by a flexible diaphragm; a piston mounted for movement to flex said diaphragm to vary the volume of said inner chamber; means to convey a percentage of the weight of said tool string to said piston and said inner chamber; a pressure gauge; a suitable conduit connecting said inner chamber and said gauge; an elastic fluid in said chamber, conduit and gauge adapted to act as a medium whereby pressure in said chamber is communicated to said gauge; an intake and exhaust means operative by the movement of said piston to admit fluid under pressure to said chamber or to exhaust the same therefrom; mechanism attachable to said draw-works which is responsive to said pressure gauge and which is adapted to cause said draw-works to wind or unwind said cable; adjustable means in said gauge which are responsive to changes of pressure in said gauge and which will cause said mechanism to cause said draw-works to vary the pressure of the tool string on the earth structure as directed by the provisions of said pressure gauge.

5. In a well drilling organization having a tool string, a cable to support said tool string, a draw-works including a drum to wind or unwind said cable thereby raising or lowering said tool string; and a prime mover to rotate said tool string and said cable drum; apparatus to maintain automatically a predetermined pressure of the drilling tool on the earth formation within set limits, said apparatus comprising, a weight indicator consisting of an actuator carried by said cable and actuated by the weight of said tool string; a pressure gauge connected to said actuator and adapted to be influenced by a percentage of the weight of said tool string; and mechanism attachable to said draw-works and interposed in the line of power transmission between said prime mover and said cable drum; said mechanism consisting of a frame work, a shaft rotatably mounted thereon; a pair of clutches mounted on said shaft and rotated in opposite directions by said prime mover, either of said clutches being adapted when in its operative position, to rotate said shaft in unison therewith; a worm and worm wheel gearing mounted for rotation on said frame work and connected to said shaft whereby rotation of said shaft will cause rotation of said worm wheel; a connection between said worm wheel and said cable drum whereby rotation of said worm wheel will cause rotation of said cable drum; fluid pressure operated means to cause said clutches to move to their operative positions; electrically operated means to cause said fluid pressure operated means to be set into action; said electrically operated means including a pair of electric switches connected to said pressure gauge either of which is adapted to be set to close an electric circuit at any desired pressure; and provisions whereby variations of the pressure in said pressure gauge may cause said electrically operated means to set said fluid pressure operated means into operation to move one or the other of said clutches to its operative position and cause said draw-works to vary the pressure of said drilling tool on the earth structure as directed by the functions of said pressure gauge.

6. An apparatus for controlling the pressure and feed of rotary well drilling rigs comprising a supporting line adapted to carry a drill pipe, a reel to take up and let out said supporting line, a prime mover for operating said reel and to rotate said drill pipe, a controlling mechanism which controls the operation of said reel by said prime mover, said controlling mechanism comprising gearing in connection with said reel and a tension measuring device which deflects a portion of said line out of its normal position and which includes a cylinder containing a liquid, a piston arranged in said cylinder and engaging one side of said line, a frame on which said cylinder is mounted, two supports secured to said frame which are adapted to bear against said line in opposition to said piston so that tension in said line will cause piston to exert a proportional pressure against the said liquid in said cylinder, a pressure gauge in connection with said cylinder to indicate the pressure therein, electrically operated means in connection with said gauge and said gearing in said controlling mechanism whereby the operation of said reel is caused to be controlled by the said gauge.

7. An apparatus to control the pressure and feed of rotary well drilling rigs comprising a supporting line adapted to carry a drill pipe, a reel to wind up or let out said supporting line, a drive shaft rotatably mounted and having a connection with said reel whereby rotation of said shaft will rotate said reel, a prime mover to rotate said drill pipe and said drive shaft, a controllable connecting mechanism between said prime mover and said drive shaft whereby the application of power to said shaft and the direction of rotation thereof may be controlled, a weight indicator consisting of an actuator and indicating gauge to indicate the weight of said drill pipe, said actuator comprising a frame carried by said supporting line, a cylinder mounted in said frame, a piston in said cylinder, a lever rockably mounted in said frame and adapted to carry a percentage of the weight of said drill pipe, a connection between said lever and said piston whereby the stress in said lever is communicated to said piston, valve means operated by movement of said piston to allow fluid under pressure to enter said cylinder, valve means operated by movement of said piston to allow fluid in said cylinder to exhaust to the atmosphere, a conduit connection between said cylinder and said indicating gauge, electrically operated means in connection with said indicating gauge and said controllable connecting mechanism whereby the said controllable connecting mechanism is caused to be operated and controlled by said indicating gauge.

8. In a rotary well drilling organization, a device to control the pressure of the drill on the earth structure, comprising a drill pipe suspended from a supporting line, a reel to take up or let out said supporting line, a pair of clutches mounted to rotate in opposite directions and connected to said reel so that either clutch when in operative engagement will cause said reel to rotate in unison therewith, a prime mover to rotate said clutches and said drill pipe, a weight indicator comprising an actuator and indicating gauge which is actuated by and adapted to indicate the weight of said drill pipe, fluid operated means to cause the said clutches to move into or out of operative engagement, an electric circuit including switches and a magnetic valve in connection with said indicating gauge and said fluid operated means whereby one of said clutches may be caused to be operated by said indicating gauge, a second electric circuit including switches and a magnetic valve in connection with said indicating gauge and said fluid operated means whereby the other of said clutches may be caused to be operated by said indicating gauge, and a source of electrical energy for said electric circuits.

9. In a rotary well drilling rig, an apparatus to control the feed and pressure of the drilling bit, comprising a drill pipe with a bit on the end thereof, a supporting line, a reel rotatably mounted to wind up or let out said supporting line, a pair of clutches rotatably mounted and operatively connected to said reel so that one of said clutches when in operative engagement will rotate said reel in a direction to wind up said supporting line and the other of said clutches when in operative engagement will rotate said reel in a direction to let out said line, a prime mover to rotate said clutches and said drill pipe, a weight indicator including an indicating gauge which is actuated by and indicates the weight of said drill pipe, adjustable electric contacts in said gauge, electrically operated means connected between said gauge and said clutch moving mechanism whereby the rotation of said reel is controlled by the activities of said gauge.

10. In a rotary well drilling rig, an apparatus to control the feed and pressure of the drill on the earth structure, comprising a drill pipe with a bit on the end thereof, a supporting line for said drill pipe, a reel to wind up or let out said supporting line, a braking means on said reel to control the letting out of said line, a prime mover to rotate said drill pipe and to operate said reel to wind up said line, a weight indicator comprising an actuator carried by the said supporting line and which sustains the load of the drill pipe, and an indicating gauge in connection with said actuator to indicate the weight of said drill pipe, said actuator comprising a housing in which is rockably mounted a lever from which the load is suspended, a cylinder mounted in said housing, a piston in said cylinder, a connection between said piston and said lever whereby a percentage of the weight of said drill pipe is imparted to said piston, valve means operable by the travel of said piston to permit an elastic fluid under pressure to be the medium to convey the pressure on the piston from the pipe load to the indicating gauge, fluid operated means to operate said braking means, electrically operated means in connection with said gauge and said fluid operated means whereby the operation of said braking means is controlled by said gauge.

WATSON L. HAWK.